Sept. 8, 1953  A. A. HOBBS  2,651,532
CLAMP FOR SCAFFOLDING TUBES AND LIKE MEMBERS
Filed June 12, 1947

Inventor
A. A. Hobbs

Patented Sept. 8, 1953

2,651,532

UNITED STATES PATENT OFFICE 2,651,532

CLAMP FOR SCAFFOLDING TUBES AND LIKE MEMBERS

Archibald Alfred Hobbs, London, England, assignor to Acrow (Engineers) Limited, London, England Application June 12, 1947, Serial No. 754,242
In Great Britain October 16, 1945

Section 1, Public Law 690, August 8, 1946
Patent expires October 16, 1965

2 Claims. (Cl. 287—54)

This invention relates to clamps for clamping scaffolding tubes and like cylindrical members (hereinafter included in the generic term "tubes") and of the kind known as a swivel coupler, that is, one having two members each of which is adapted to receive an individual tube and which are connected by a swivel joint so that the tubes may be made to assume any desired inclination relatively to one another.

The object of the present invention is to devise an improved form of swivel coupler by means of which the tubes may be securely locked in position without causing any damage to the tubes, and the invention consists in a clamp of the kind referred to in which each member is formed with a groove or recess, the inner side of which is curved to the radius of the tube while the outer side is more or less flattened and carries a clamping screw the axis of which is arranged outside the centre line of the tube when the latter is disposed in its arcuate recess so that, due to such eccentricity, the tightening of the clamping screw forces the tube into the arcuate recess or groove and locks it securely therein.

The accompanying drawings illustrate one convenient form of coupler in accordance with the invention.

Figure 1:
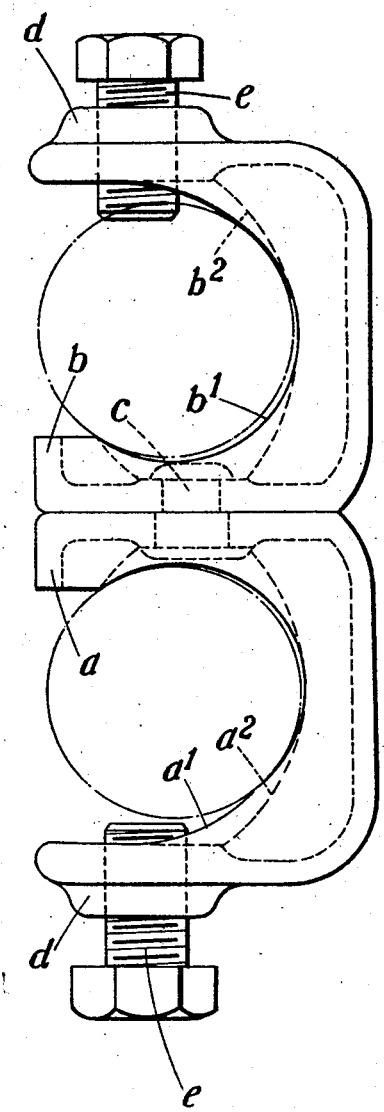
Figure 2:
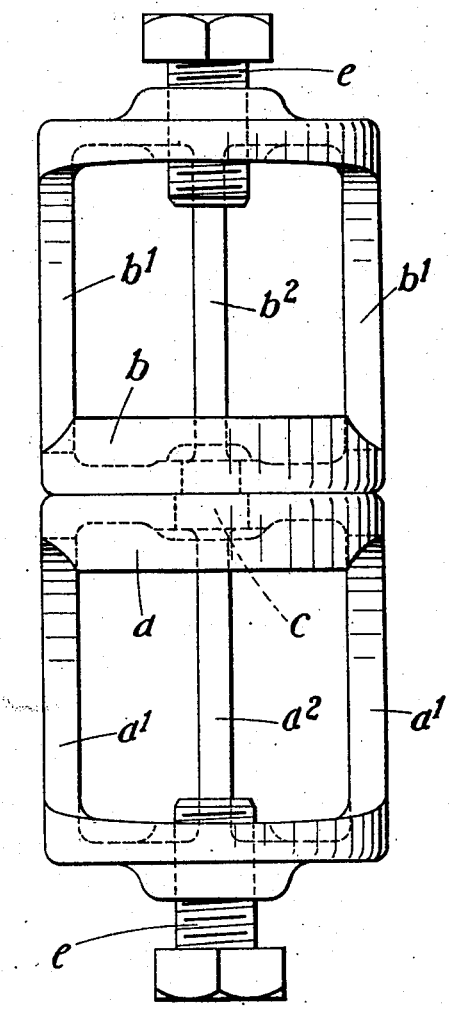

Figure 1 is an elevation, and
Figure 2 is a plan.

In carrying my invention into effect in one convenient manner I form my improved swivel coupler from two saddle-like members $a$ $b$ coupled together at their inner sides by a swivel pin or pivot $c$ so that the members may be made to assume any desired inclination to one another. Each of the members is formed as a casting or pressing and is conveniently formed with outer ribs $a'$ $b'$ and an intermediate rib $a^2$ $b^2$ of curved form upon which the tube may rest. The two outer ribs $a'$ $b'$ of each member are curved at their inner portions to the radius of the tube so that the tube may fit snugly therein. The outer portions of each saddle member and outer ribs thereof are more or less flattened and in a base $d$ on each such outer part it threaded a clamping screw $e$, the axis of which lies outside the axis of the tube when inserted in the arcuate recess as clearly seen in Figure 1. It will be evident that when the clamping screw is tightened up it will contact the tube at a point beyond the axis thereof, and due to this eccentricity of the clamping screw in relation to the arcuate recess the operation of tightening the clamping screw will force the tube into the recess or groove and will securely lock the same therein without however damaging the tube due to the camming action, as it were, of the screw upon the surface of the tube tending to wedge the latter into its recess.

The invention is not limited to the particular details of construction hereinbefore given by way of example and I may modify the precise form of saddle-like members constituting the swivel coupler (making the same with or without ribs or projections as may be desired) and the manner in which the same are pivotally secured together depending upon any practical requirements that may have to be fulfilled.

I claim:

1. A clamp assembly for tubes comprising two members and a swivel joint connecting said members together so that the members may turn relative to each other, means defining a groove-like recess in each of said members having a substantially part-cylindrical surface of substantially the same radius as the tube to be clamped, and a clamping screw for each member the axis of each screw being parallel to the axis of the swivel joint between the members and adapted to pass through the tube disposed in the recess therein to the side of the axis thereof remote from the part-cylindrical surface and outside the axis of the said swivel joint.

2. A clamp assembly for tubes comprising two substantially U-shaped members arranged with one leg of each member in facial contact, a swivel joint connecting said legs whereby the members may rotate relative to each other, spaced apart ribs on the legs and web of each member provided with a part-cylindrical surface of substantially the same radius as the tube to be clamped and a clamping screw for the other leg of each of said members, the axis of each screw being parallel to the axis of the swivel joint and adapted to pass through the tube lodged in the member to the side of the axis thereof remote from said ribs and outside the axis of the swivel joint.

ARCHIBALD ALFRED HOBBS.

References Cited in the file of this patent

UNITED STATES PATENTS

| Number | Name | Date |
|---|---|---|
| 484,660 | Kenworthy | Oct. 18, 1892 |
| 499,420 | Frankel | June 13, 1893 |
| 1,338,746 | Mathias | May 4, 1920 |
| 1,486,158 | Price | Mar. 11, 1924 |
| 1,920,130 | Pease et al. | July 25, 1933 |
| 1,942,701 | Hilton | Jan. 9, 1934 |
| 2,060,171 | Burton | Nov. 10, 1936 |
| 2,088,890 | Winby et al. | Aug. 3, 1937 |
| 2,091,763 | Macbeth | Aug. 31, 1937 |
| 2,101,317 | Lemieux | Dec. 7, 1937 |

FOREIGN PATENTS

| Number | Country | Date |
|---|---|---|
| 34,928 | Netherlands | Mar. 15, 1935 |
| 146,948 | Austria | Sept. 10, 1936 |
| 225,758 | Great Britain | Dec. 11, 1924 |
| 231,230 | Great Britain | Mar. 23, 1925 |
| 670,050 | France | Aug. 12, 1929 |